United States Patent
Gits et al.

(10) Patent No.: US 7,415,516 B1
(45) Date of Patent: Aug. 19, 2008

(54) NET LURKERS

(75) Inventors: Peter Michael Gits, Agoura Hills, CA (US); Dale J. Seavey, Sunol, CA (US); Hoan T. Dang, Danville, CA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 09/882,221

(22) Filed: Jun. 15, 2001

Related U.S. Application Data (60) Provisional application No. 60/223,824, filed on Aug. 8, 2000.

(51) Int. Cl.
*G06F 15/173* (2006.01)
*G06F 15/16* (2006.01)

(52) U.S. Cl. .................. 709/224; 709/206; 709/228

(58) Field of Classification Search .......... 709/227, 709/223, 224, 206, 228
See application file for complete search history.

(56) References Cited

U.S. PATENT DOCUMENTS

| | | | |
|---|---|---|---|
| 4,585,906 A | 4/1986 | Matthews et al. | 379/88.26 |
| 4,972,367 A * | 11/1990 | Burke | 707/10 |
| 5,049,873 A * | 9/1991 | Robins et al. | 340/825.01 |
| 5,299,207 A * | 3/1994 | Fujii | 714/45 |
| 5,327,486 A | 7/1994 | Wolff et al. | 379/93.23 |
| 5,432,839 A | 7/1995 | DeLuca | 340/7.21 |
| 5,493,692 A * | 2/1996 | Theimer et al. | 455/26.1 |
| 5,524,137 A | 6/1996 | Rhee | 379/88.01 |
| 5,594,859 A | 1/1997 | Palmer et al. | |
| 5,638,514 A * | 6/1997 | Yoshida et al. | 709/224 |
| 5,742,905 A | 4/1998 | Pepe et al. | 455/461 |
| 5,787,262 A | 7/1998 | Shakib et al. | 395/200.35 |
| 5,799,306 A | 8/1998 | Sun et al. | 707/10 |
| 5,809,478 A | 9/1998 | Greco et al. | |
| 5,867,495 A | 2/1999 | Elliott et al. | |
| 5,884,324 A | 3/1999 | Cheng et al. | |
| 5,905,789 A | 5/1999 | Will | 379/211.03 |
| 5,928,325 A * | 7/1999 | Shaughnessy et al. | 709/206 |
| 5,953,050 A | 9/1999 | Kamata et al. | |
| 6,009,103 A | 12/1999 | Woundy | 370/401 |
| 6,029,175 A | 2/2000 | Chow et al. | 707/104 |
| 6,061,740 A | 5/2000 | Ferguson et al. | |
| 6,072,522 A | 6/2000 | Ippolito et al. | |
| 6,091,811 A | 7/2000 | Chang et al. | 379/265.02 |
| 6,091,948 A | 7/2000 | Carr et al. | 455/414.1 |
| 6,092,102 A | 7/2000 | Wagner | 340/7.29 |
| 6,094,213 A | 7/2000 | Mun et al. | |

(Continued)

OTHER PUBLICATIONS

Benedicto, Regions: A Scalable Infrastructure for Scoped Service Location in Ubiquitous Computing, May 1999, Massachusetts Institute of Technology 1999, pp. 2-109.

(Continued)

*Primary Examiner*—Jason Cardone
*Assistant Examiner*—Thomas Duong
(74) *Attorney, Agent, or Firm*—Marger Johnson & McCollom, P.C.

(57) ABSTRACT

A user uses a lurker to check a colleague's location electronically. If the colleague is at the location and a device is available for communicating with the colleague, a communications channel is established between a device near the lurker and the colleague's device, and communication can begin.

19 Claims, 9 Drawing Sheets

U.S. PATENT DOCUMENTS

| | | | |
|---|---|---|---|
| 6,137,876 A | 10/2000 | Wong et al. | 379/246 |
| 6,161,137 A | 12/2000 | Ogden et al. | |
| 6,170,015 B1 | 1/2001 | Lavian | 709/232 |
| 6,185,611 B1* | 2/2001 | Waldo et al. | 709/221 |
| 6,216,158 B1* | 4/2001 | Luo et al. | 709/217 |
| 6,226,666 B1 | 5/2001 | Chang | |
| 6,249,570 B1 | 6/2001 | Glowny et al. | 379/88.22 |
| 6,253,256 B1 | 6/2001 | Wollrath et al. | 709/330 |
| 6,256,663 B1 | 7/2001 | Davis | |
| 6,335,927 B1 | 1/2002 | Elliott et al. | |
| 6,353,661 B1 | 3/2002 | Bailey, III | 379/93.25 |
| 6,373,517 B1 | 4/2002 | Davis et al. | |
| 6,412,017 B1 | 6/2002 | Straube et al. | |
| 6,421,686 B1 | 7/2002 | Martin, Jr. | 707/201 |
| 6,434,594 B1 | 8/2002 | Wesemann | 709/201 |
| 6,442,565 B1 | 8/2002 | Tyra et al. | 707/102 |
| 6,457,065 B1 | 9/2002 | Rich et al. | 709/328 |
| 6,463,446 B1 | 10/2002 | Wollrath et al. | |
| 6,493,671 B1 | 12/2002 | Ladd | |
| 6,532,218 B1 | 3/2003 | Shaffer et al. | |
| 6,559,863 B1 | 5/2003 | Megiddo | |
| 6,560,637 B1 | 5/2003 | Dunlap et al. | |
| 6,564,216 B2 | 5/2003 | Waters | 707/100 |
| 6,587,455 B1 | 7/2003 | Ray et al. | 370/352 |
| 6,604,127 B2* | 8/2003 | Murphy et al. | 709/203 |
| 6,615,223 B1 | 9/2003 | Shih et al. | 707/201 |
| 6,636,238 B1 | 10/2003 | Amir et al. | |
| 6,643,650 B1* | 11/2003 | Slaughter et al. | 707/10 |
| 6,697,806 B1 | 2/2004 | Cook | 707/9 |
| 6,714,979 B1 | 3/2004 | Brandt et al. | 709/225 |
| 6,724,896 B1 | 4/2004 | Beckett et al. | 380/49 |
| 6,751,657 B1 | 6/2004 | Zothner | 709/220 |
| 6,788,980 B1* | 9/2004 | Johnson | 700/1 |
| 6,789,077 B1 | 9/2004 | Slaughter et al. | |
| 6,792,466 B1* | 9/2004 | Saulpaugh et al. | 709/229 |
| 6,795,108 B2 | 9/2004 | Jarboe et al. | |
| 6,859,931 B1* | 2/2005 | Cheyer et al. | 719/317 |
| 6,934,755 B1* | 8/2005 | Saulpaugh et al. | 709/226 |
| 6,993,570 B1* | 1/2006 | Irani | 709/218 |
| 2007/0124363 A1* | 5/2007 | Lurie et al. | 709/202 |

OTHER PUBLICATIONS

Arnold, The Jini Architecture: Dynamic Services in a Flexible Network, ACM, Jun. 1999.

Aschemann et al., A Framework for the Integration of Legacy Devices into a Jini Management Federation, Springer-Verlag, Oct. 1999.

Arnold, "*The Jini Architecture: Dynamic Services in a Flexible Network*," 1999, 6 pgs.

Aschermann et al., "A Framework for the Integration of Legacy Devices into a Jini Management Federation," *Springer-Verlag*, Oct. 1999, 12 pgs.

Benedicto, "Regions: A Scalable Infrastructure for Scoped Service Location in Ubiquitous Computing," *Massachusetts Institute of Technology*, May 1999, pp. 2-109.

\* cited by examiner

FIG. 7C

NET LURKERS

RELATED APPLICATION DATA

This application claims priority from U.S. patent application Ser. No. 09/710,544, filed Nov. 8, 2000, entitled "NET LURKERS", which is hereby abandoned.

This application is a continuation of, and claims priority to, U.S. Provisional Patent Application Ser. No. 60/223,824, filed Aug. 8, 2000.

CROSS REFERENCE TO RELATED APPLICATIONS

This application relates to the following U.S. patent applications, all commonly assigned to the assignee of this application.

| Ser. No. | Title | Filed |
|---|---|---|
| 09/676,147 | Fully Distributed, Scalable Infrastructure, Communication System | Sep. 29, 2000 |
| 09/698,779 | Smart Secretary | Oct. 27, 2000 |
| 09/711,378 | Replication of a Scalable Infrastructure System | Nov. 09, 2000 |
| 09/695,750 | Object Agents in a Scalable Infrastructure System | Oct. 24, 2000 |
| 09/746,798 | Address Services in a Scalable Infrastructure System | Dec. 20, 2000 |
| 09/694,740 | Interconnective Agents in a Scalable Infrastructure System | Oct. 23, 2000 |
| 09/713,155 | Conference Calling in a Scalable Infrastructure System | Nov. 14, 2000 |
| 09/697,821 | Method of Managing a Scalable Infrastructure Communication System | Oct. 26, 2000 |

FIELD

This invention pertains to object routing and, more particularly, to object routing in a Scalable Infrastructure system.

BACKGROUND

In days gone by, when co-workers wished to consult each other, they would simply get up from their chair and walk to their colleague's office. But the advent of the telephone and, more recently, the computer has eliminated the need to directly visit a colleague's office. Instead, a call on the telephone system, or a quick chat via instant messaging has enable communication without the need for physical activity. If a user needs a file, since everyone's offices are networked together and almost all files are electronic, the user can simply access their colleague's file via the network.

Aside from the physical ramifications of the lack of exercise, this interconnectivity has also led to the isolation of workers. Because workers can communicate electronically, they do not need to make physical contact with each other. There has also been an impact on communications, in the loss of the ability to leave messages. When people had to physically visit a colleague's office, if the colleague was absent, the user would leave a message. But using a computer to visit a colleague's files electronically does not allow for messages of that sort, and voicemail is not adequate to the task, for example, in case a drawing must be left for the colleague. Further, there is currently no capability that parallels visiting a common area. For example, to contact technical support, the user does not care with which person he speaks, only that he speaks with someone in technical support.

The present invention addresses these and other problems associated with the prior art.

SUMMARY

To enable users to electronically "lurk" to a colleague's office or other location, a Scalable Infrastructure system is employed. A network receiving agent is responsible for determining a user's availability, as well as the devices in the user's office over which colleagues can contact the user. A network lurking agent, invoked by a user wishing to visit a colleague, makes an inquiry of the network receiving agent to determine whether the colleague is available and, if the colleague is available, which devices can be used to contact the colleague. The network receiving agent and network lurking agent can then open communications between the user and his colleague.

The foregoing and other features, objects, and advantages of the invention will become more readily apparent from the following detailed description, which proceeds with reference to the accompanying drawings.

DETAILED DESCRIPTION

Figure 1:
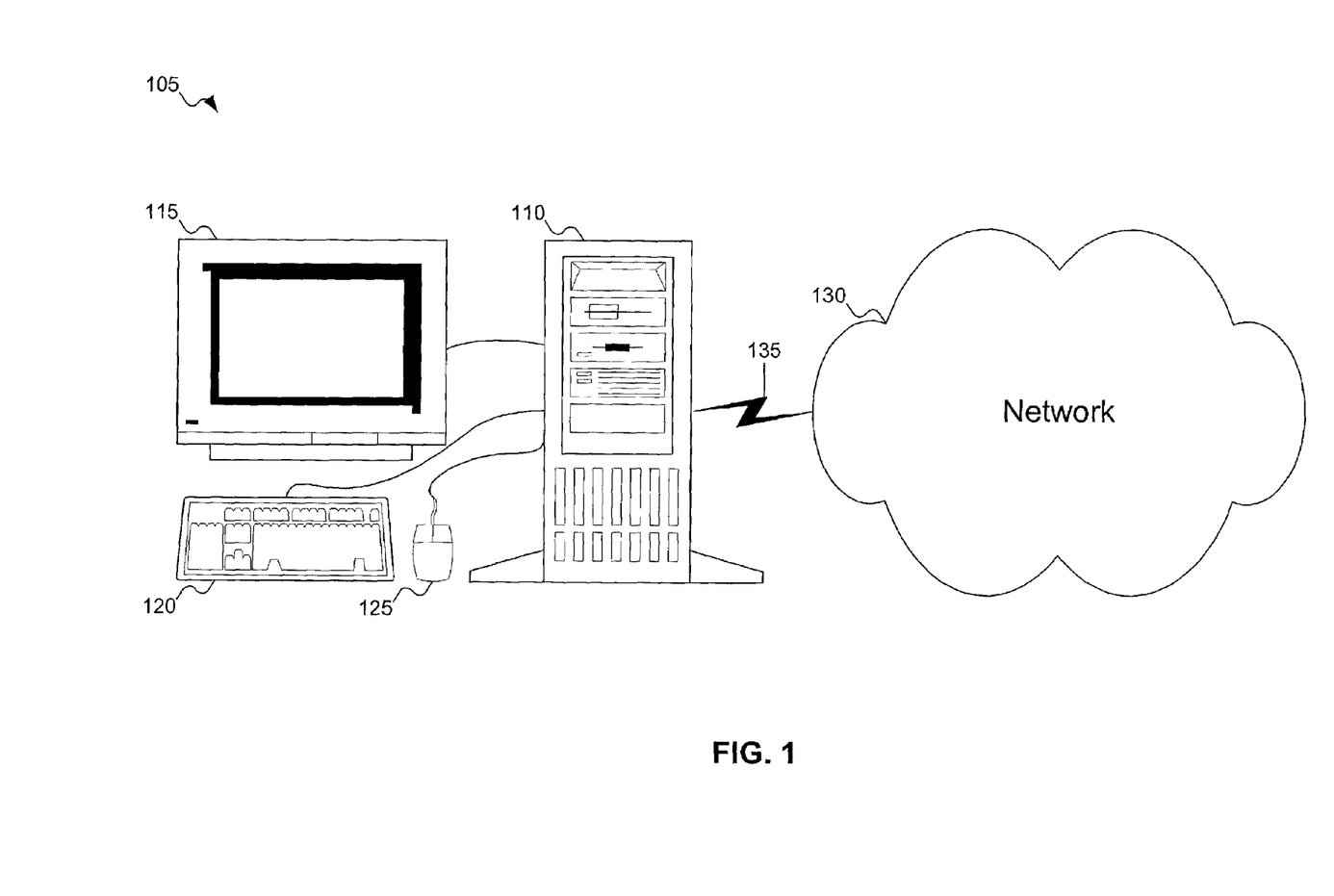
FIG. 1 shows a computer on which the preferred embodiment of the invention is operable, connected to a network.

FIG. 1 shows a computer system 105 in accordance with the invention. Computer system 105 includes a computer 110, a monitor 115, a keyboard 120, and a mouse 125. Computer 110 includes hardware components, such as processor and memory (not shown). Computer system 105 may also include other equipment not shown in FIG. 1, for example, other input/output equipment or a printer.

In FIG. 1, computer system 105 is connected to network 130 via network connection 135. A Scalable Infrastructure system for use in distributed communication systems as described in U.S. patent application Ser. No. 09/676,147, titled "Fully Distributed, Scalable Infrastructure, Communication System," filed Sep. 29, 2000, operates over network 130. The network receiving agent and network lurking agent, either or both running on computer system 105, are part of the Scalable Infrastructure system. The following material is drawn from U.S. patent application Ser. No. 09/676,147 titled "Fully Distributed, Scalable Infrastructure, Communication System" filed Sep. 20, 2000:

The Scalable Infrastructure system uses a combination of a persistent store and agents to provide a communication system extensible to nearly all types of interfaces and any number of users and applications. The Scalable Infrastructure system defines Communities around the persistent store, or Space, with Space/or non-Space oriented interpreters, referred to here as Double Agents Double Agents will be discussed in more detail further.

A Community as used here, will refer to a collection of these agents and a persistent store. Any type of persistent store could be used, with the capabilities of having objects inserted into the store such that they do not lose their attributes and of providing a notification service as the objects are inserted. In this particular example, JavaSpaces™ [technology] will be used as the persistent stores, but the Scalable Infrastructure system is applicable to any similar technology. For ease of discussion, the persistent stores will be referred to as "Spaces."Spaces can be used in several different implementation and the following discussion is meant only as an example.

By maintaining the "wellness" information of agents and services within a Community, the Community Service also has the ability to launch new clones of these agents and services throughout the different Communities based on load metrics. This provides for some dynamic distributed load behavior. For example, if one [Community] where to be hit with a 1000 calls within a minute, the Community Service could launch another (N) agents anywhere within the Community to handle this increased load. This Service could also leverage addition hardware that is on standby to increase performance during peak loads. Alternatively, it could shut down lightly utilized agents and unused Services when the load decreases. Members interact with the Spaces via the agents, and unused agents can be removed to make room for new agents. Most of these agents are what will be referred to as "Double Agents."

Double Agents are analogous to translation modules. They can communicate with one protocol on one side and the protocol used in the Space on the other. Each Space will have a set of dedicated Double Agents. For example, a Space with a phone member will have a phone Double Agent. It may interact according to a common protocol, such as SIP (session initiation protocol), with a SIP phone. It will then convert the request or other communication from the SIP phone to Space protocols. The Space protocol will more than likely involve a typing process to type the communication according to Java™ types and then placing it as an object in the Space.

Double Agents are notified of new objects placed in the Space by a publish-and-subscribe process. Devices that interact with certain types of objects will subscribe with the Space to be notified when such an object is inserted into the Space. The Space then publishes the new object to all of the subscribed Double Agents. The subscribed Double Agents then pick it up from the Space. The object placed in the Space will be leased, and if no agent picks up the object before the lease expires, the object will be removed.

The nature of the Double Agents allows the system to be extremely scalable and extensible. If the system is to be made larger, a larger number of any type of Double Agents can be added. If more types of interfaces are needed, all the system requires to extend to include these are Double Agents written for those devices. The production of Double Agents is expedited by use of a class library.

An individual Community revolves around a Space, usually a local Space. The Space allows decoupling of associations between applications, clients, servers, proxies, etc., and acts as an intermediary. It also allows for typing of objects as well as a notification process for any new objects entered into the Space. Using the Space alleviates the problems with Jini™ [technology], noted above, when used in combination with the Double Agents and the Community Service.

(JavaSpaces, Java, and Jini are trademarks or registered trademarks of Sun Microsystems, Inc. in the United States and other countries.)

Figure 2:
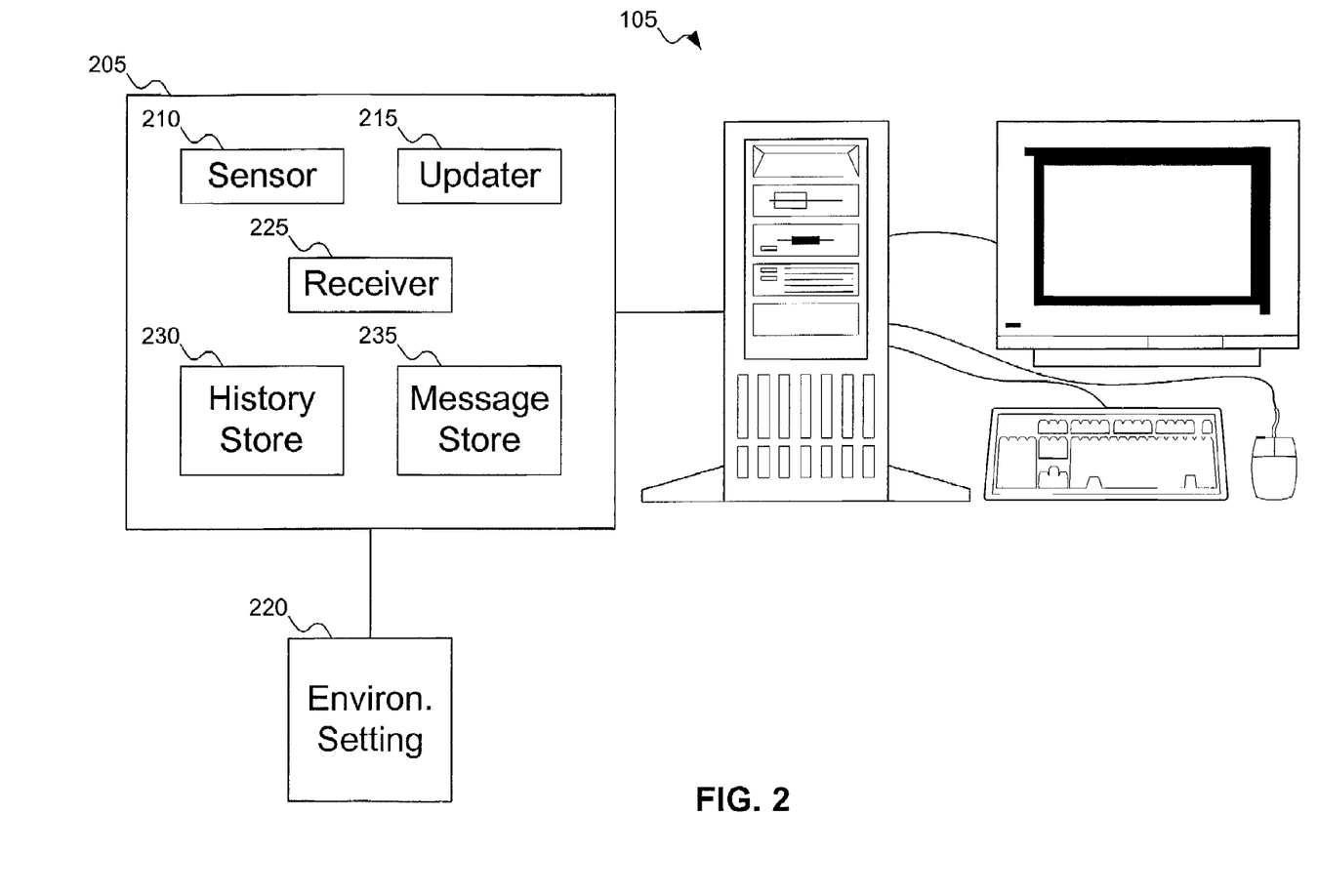
FIG. 2 shows software used by a network receiving agent in the computer system of FIG. 1.

FIG. 2 shows software used by a network receiving agent in the computer system of FIG. 1. In FIG. 2, network receiving agent 205 is operating on computer system 105. Network receiving agent 205 includes sensor software 210 to sense changes in an environment and updater software 215 to update environment setting 220. The operation of sensor software 210 and updater software 215 is discussed more with reference to FIG. 4 below. Network receiving agent 205 also includes receiver software 225 to receive an inquiry from a network lurking agent, history store 230 to track the history of who has attempted to contact network receiving agent 205, and message store 235 to store messages left for the user with network receiving agent 205. The operation of receiver software 225, history store 230, and message store 235 is discussed more with reference to FIG. 5 below.

Figure 3:
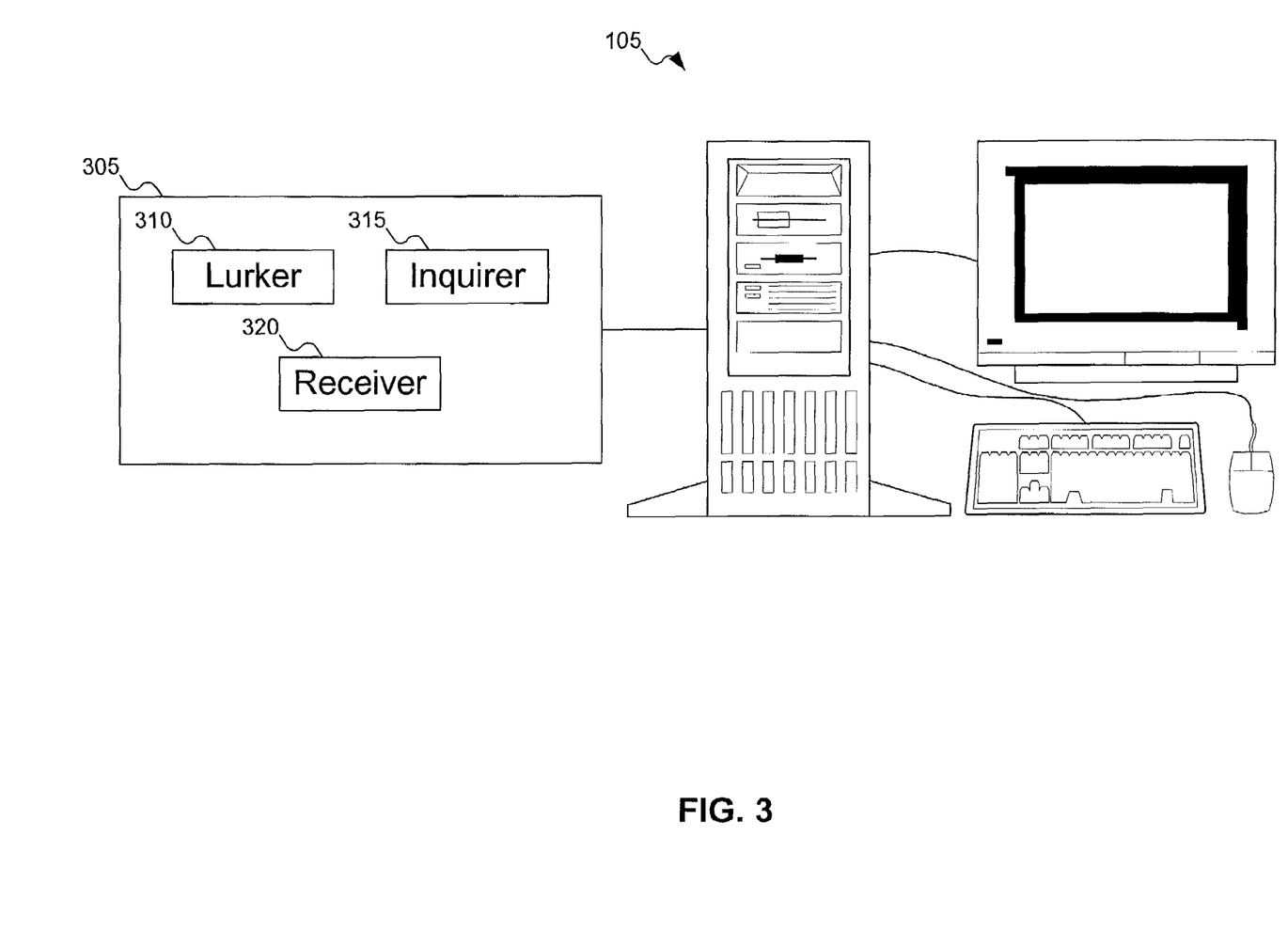
FIG. 3 shows software used by a network lurking agent in the computer system of FIG. 1.

FIG. 3 shows software used by a network lurking agent in the computer system of FIG. 1. In FIG. 3, network lurking agent 305 is operating on computer system 105. Network lurking agent 305 includes lurker software 310 to lurk to a colleague's office (or other location, depending on the setting for Net Lurkers), inquirer software 315 to inquire as to the availability of the colleague, and receiver software 320 to receive a message from a network receiving agent. In the preferred embodiment, lurker software 310 includes a web browser, and the colleague's office is identified using a universal resource locator (URL). However, a person skilled in the art will recognize that lurking can be accomplished using techniques: for example, representing offices or other locations with folders, where users drop their names into the folder when they are to be considered "in the room." The operation of lurker software 310, inquirer software 315, and receiver software 320 is discussed more with reference to FIG. 5 below.

Figure 4:
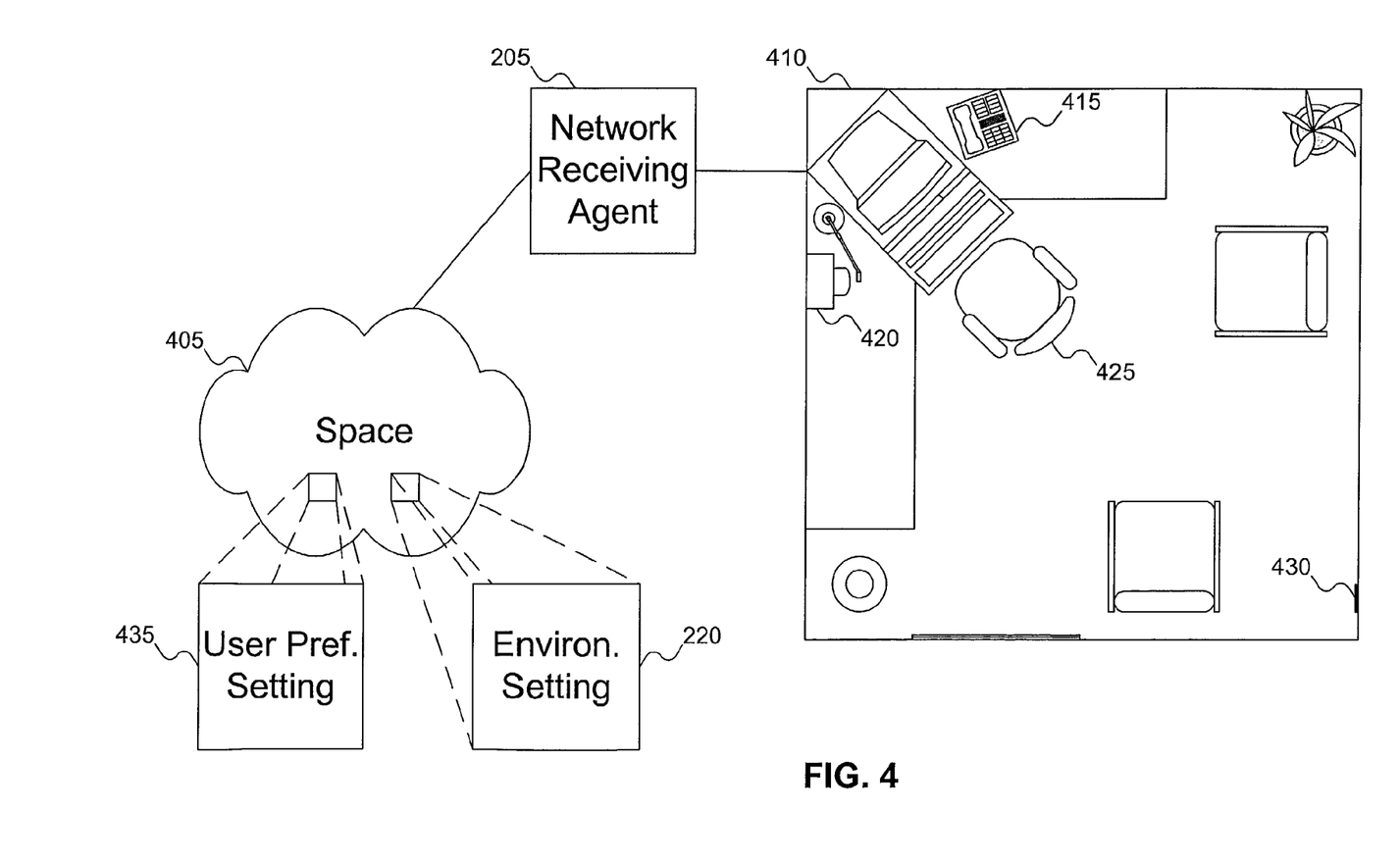
FIG. 4 shows a user's office, over which a network receiving agent according to the preferred embodiment of the invention can operate.

FIG. 4 shows a user's office, over which a network receiving agent according to the preferred embodiment of the invention can operate. In FIG. 4, network receiving agent 205 is coupled to Space 405, which is part of the Scalable Infrastructure system described above with reference to FIG. 1. Network receiving agent 205 is also connected to office 410. Recall that in the preferred embodiment, the office is represented as a URL. The URL is used when a network lurking agent is attempting to "lurk" by office 410. But network receiving agent 205 also receives sensor information from office 410 about devices in office 410, and about whether the user is in office 410. For example, in office 410, telephone 415 and video camera 420 can be seen. Network receiving agent 205 receives information from these devices as to whether they are operational and in use. For example, if video camera 420 is non-functional, network receiving agent 205 knows that the user cannot be contacted using video camera 420. Similarly, if the user is on one line of telephone 415, network receiving agent 205 knows that the user cannot be reached via that line of telephone 415 for a private conversation. But network receiving agent 205 also knows that, if the conversation permits it, a third party can join the conversation on that line of telephone 415. Eventually, when the user hangs up, telephone 415 informs-network receiving agent 205 that all lines are available on telephone 415.

Network receiving agent 205 can also receive sensor data from devices that most people would probably not consider devices. For example, chair 425 can be equipped with a pressure sensing device. When the user is sitting in chair 425, chair 425 informs network receiving agent that the user is sitting in chair 425, and therefore is in office 410.

Alternatively, network receiving agent can receive information about the user's presence from room sensor 430. Room sensor 430 uses some form of wireless sensing to determine if the user is in office 410. For example, room sensor 430 can use infrared technology to sense that a person is in office 410. Alternatively, room sensor 430 can communicate wirelessly with a badge worn by the user while in the workplace; when the user is in office 410, the badge and room sensor 430 can communicate. A person skilled in the art will also recognize other ways in which network receiving agent 205 can find out whether the user is in office 410.

There are several ways in which network receiving agent 205 can receive sensor data from the devices in office 410. Preferably, when the devices become aware about a change in their operating ability (e.g., someone sits down or get up out of chair 425, a line on telephone 415 becomes in use, or video camera 420 is switched off), they inform network receiving agent 205 of the change. The devices can inform network receiving agent 205 directly, or (via agents of their own) can drop objects in Space 405 to be retrieved by network receiving agent 205, whereupon network receiving agent 205 can update environment setting 220. Alternatively, the devices can update environment setting 220 directly via their agents, rather than passing the sensor data through network receiving agent 205. In this case, network receiving agent 205 learns about changes in the environment by accessing environment setting 220. Until it needs to know about the environment, network receiving agent can remain ignorant about changes in the environment. As a further alternative, network receiving agent can periodically poll the devices to determine if their state has changed. This alternative, however, is discouraged, as it generally requires network receiving agent 205 to waste time polling the devices when no change has occurred. A person skilled in the art will recognize other ways network receiving agent 205 can receive the sensor data from the devices.

Network receiving agent 205 stores the information received from devices in office 410 in environment setting 220. Environment setting 220 is stored in Space 405 within the Scalable Infrastructure system. As network receiving agent 205 receives new sensor input from office 410, network receiving agent 205 can update environment setting 220.

A person skilled in the art will recognize that, although FIG. 4 only describes telephone 415 and video camera 420, office 410 can have other devices that can be shared in this manner. For example, electronic white boards, calendaring systems, and palm pilot devices are three other devices that can be shared by a user and a lurker. A person skilled in the art will know of other devices that can be shared.

Although there can be multiple devices through which a user may be contacted, in practice a user might prefer to be contacted using one device over another. Returning to the real-world analog, a user might also want to "shut the door," preventing anyone from visiting him. These preference settings are stored in user preference setting 435 in Space 405. Using user preference setting 435, a user can specify how or if he wishes to be contacted. For example, in FIG. 4, the user has video camera 420. Nevertheless, the user may prefer to avoid videoconferencing with another user. The user can set user preference setting 435 to indicate that only telephone 415 is to be used to contact him. Note that in this situation, video camera 420 is operational: the user has simply decided to make it unavailable. Compare this with environment setting 220, which simply indicates which devices are available. Environment setting 220 does not consider whether a device is enabled to be used: that is determined from user preference setting 435.

Figure 5:
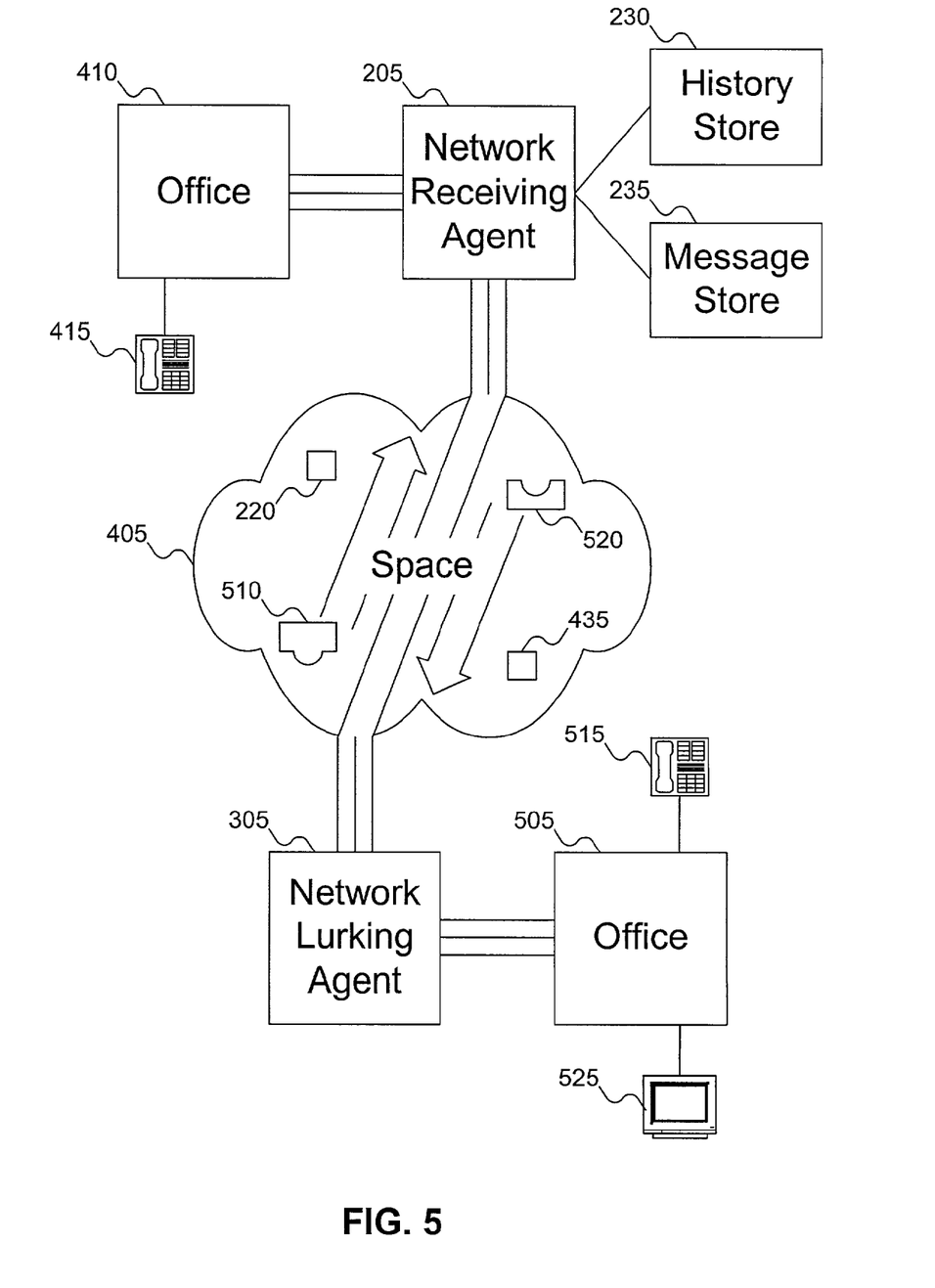
FIG. 5 shows a network receiving agent and a network lurking agent according to the preferred embodiments operating over a Space in a Scalable Infrastructure system.

FIG. 5 shows a network receiving agent and a network lurking agent according to the preferred embodiments operating over a Space in a Scalable Infrastructure system. In FIG. 5, a user in office 505 uses network lurking agent 305 to attempt to contact a colleague in office 410. Recall that in the preferred embodiment, the lurker software includes a web browser, and an office or other location is represented as a URL. The user in office 505 lurks by entering a URL for an office the user wishes to visit. For example, to visit John Doe's office, the user might enter <http://www.company-.com/JDoe.office> as the URL. Network lurking agent 305 places inquiry 510 in Space 405 to inquire as to the availability of the user in office 410. Space 405 notifies network receiving agent 205 about inquiry 510, which then takes inquiry 510 from Space 405. Network receiving agent 205 checks environment setting 220 to see if the user is in office 410. If the user is in office 410, then network receiving agent 205 and network lurking agent 305 activate available devices in the respective offices, opening communications between the users. (Communication is achieved through objects being dropped in Space 405 by the double agent for each device, the objects destined for the double agent for the other device.) For example, in FIG. 5, network receiving agent 205 and network lurking agent 305 can ring telephones 415 and 515, respectively. Once each user picks up, they are in communication.

If the user is not in office 410, network receiving agent 205 places response 520 in Space 405 for delivery to network lurking agent 305. This lets network lurking agent 305 know that the user is not available, and network lurking agent can then inform the user in office 505 of this fact. Network receiving agent 205 also makes a note of the user's inquiry in history store 230.

If the user is not in office 410, after informing the user in office 505 of the fact, network lurking agent 305 can enable the user in office 505 to leave a message for the user in office 410. This enables the visiting user to simulate the leaving of a note for a user who is out of his office. If the user wishes to leave a message, the message is constructed and delivered to network receiving agent 205 by being placed in Space 405. After network receiving agent 205 receives notice of the message and removes it from Space 405, the message is stored in message store 235, and the user in office 410 will be notified of the message upon his return.

Although in the real-world analog of physically visiting offices there is no way to distinguish between visitors when the user is out of his office, Net Lurkers provides this capability. For example, the user in office 410 might want to notify his boss that he is down the hall, consulting with another colleague. When network receiving agent checks environment setting 220 and finds that the user is not in office 410, network receiving agent 205 can also check user preference setting 435. User preference setting 435 is a setting stored in Space 405 that is individualized by each user for their preferences. For example, the user in office 410 can set user preference setting 435 to deliver the message that the user is in another office when the inquiry comes from the user's boss. This message is then returned to network lurking agent 305 as part of response 520, and is presented to the user: for example, on display 525. In this way, a user can provide individualized responses to inquiries even when out of the office.

Network receiving agent 205 can also be used to join an existing conversation. For example, assume that the user in office 410 is in the office, but on telephone 415 talking with someone. Provided environment setting 220 reflects the feature of joining an existing conversation, network receiving agent 205 can join the user in office 505 to the conversation, and network lurking agent 305 can ring telephone 515 to join the user in office 505 to the conversation.

Figure 6:
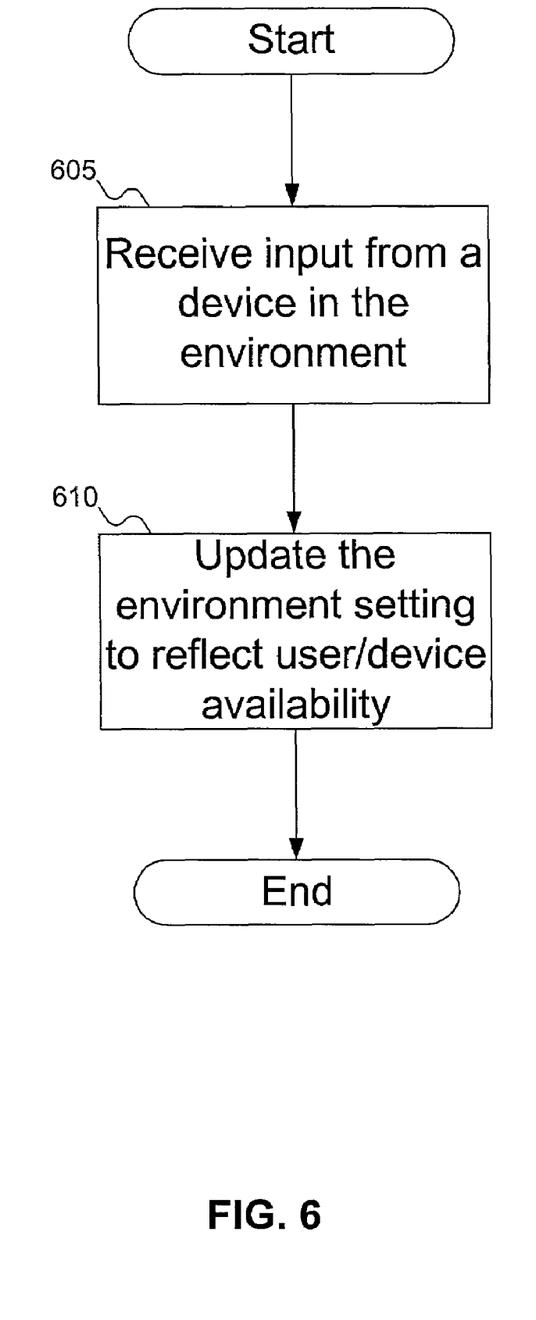
FIG. 6 shows a flowchart of the method used by the network receiving agent of FIG. 2 to update the environment setting.

FIG. 6 shows a flowchart of the method used by the network receiving agent of FIG. 2 to update the environment setting. At step 605, the network receiving agent receives input from devices/sensors in the environment. This input can reflect device or user availability or operability. Then, at step 610, the network receiving agent updates the environment setting to reflect the input received from the devices/sensors.

Figure 7A:
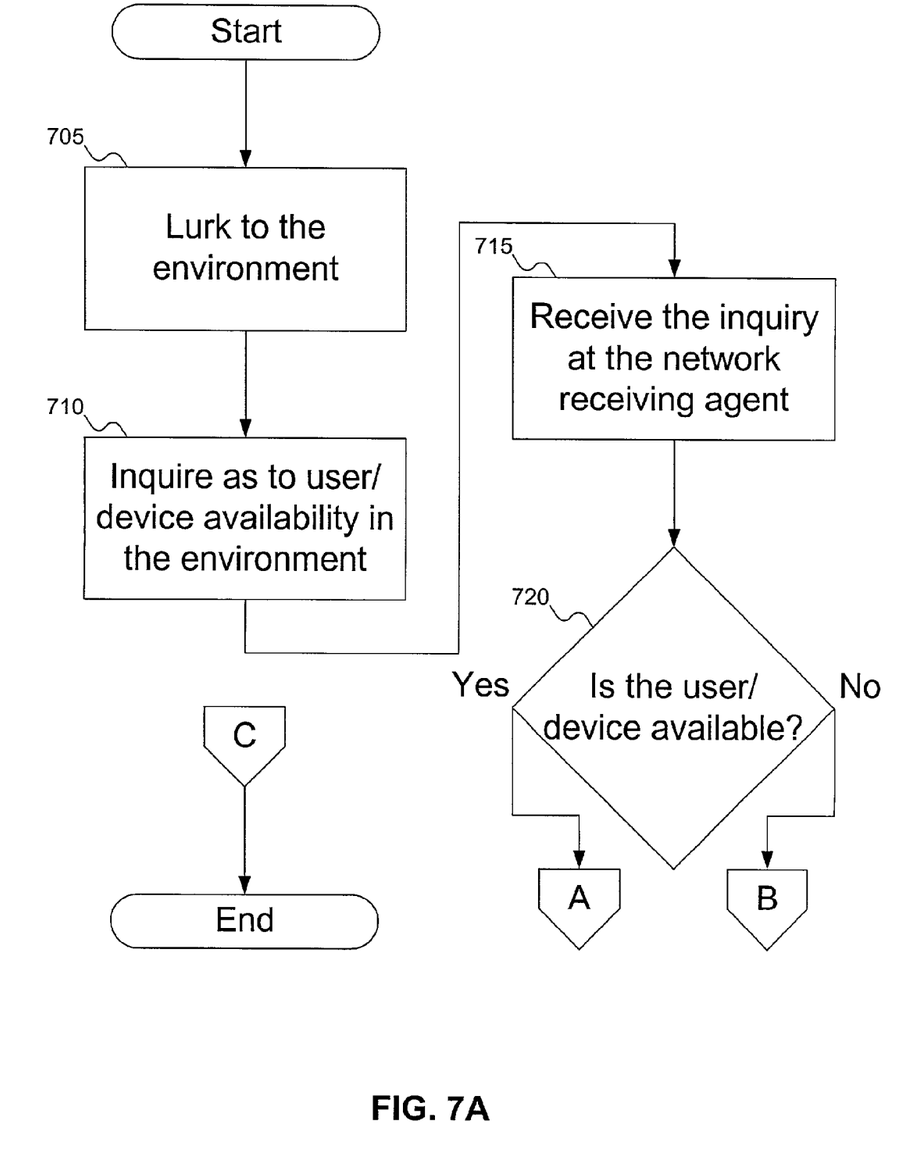
FIGS. 7A-7C show a flowchart of the method used a network lurking agent and a network receiving agent according to the preferred embodiments to enable one user to attempt to contact another user.
Figure 7B:
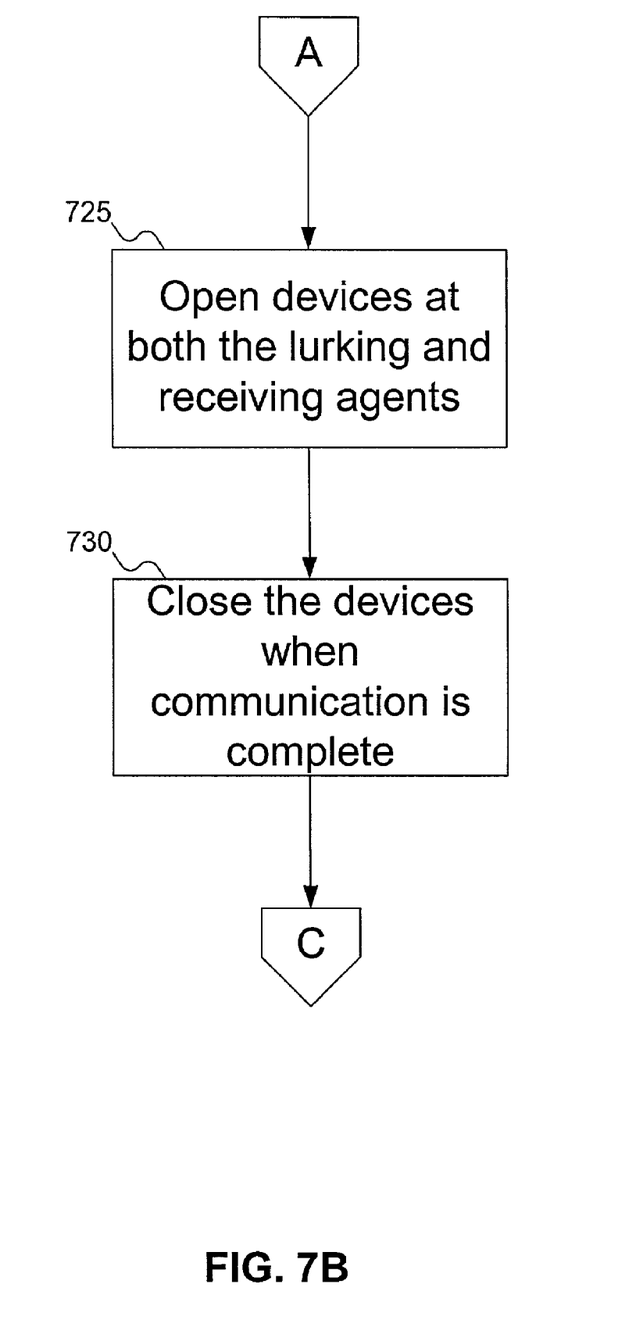
Figure 7C:
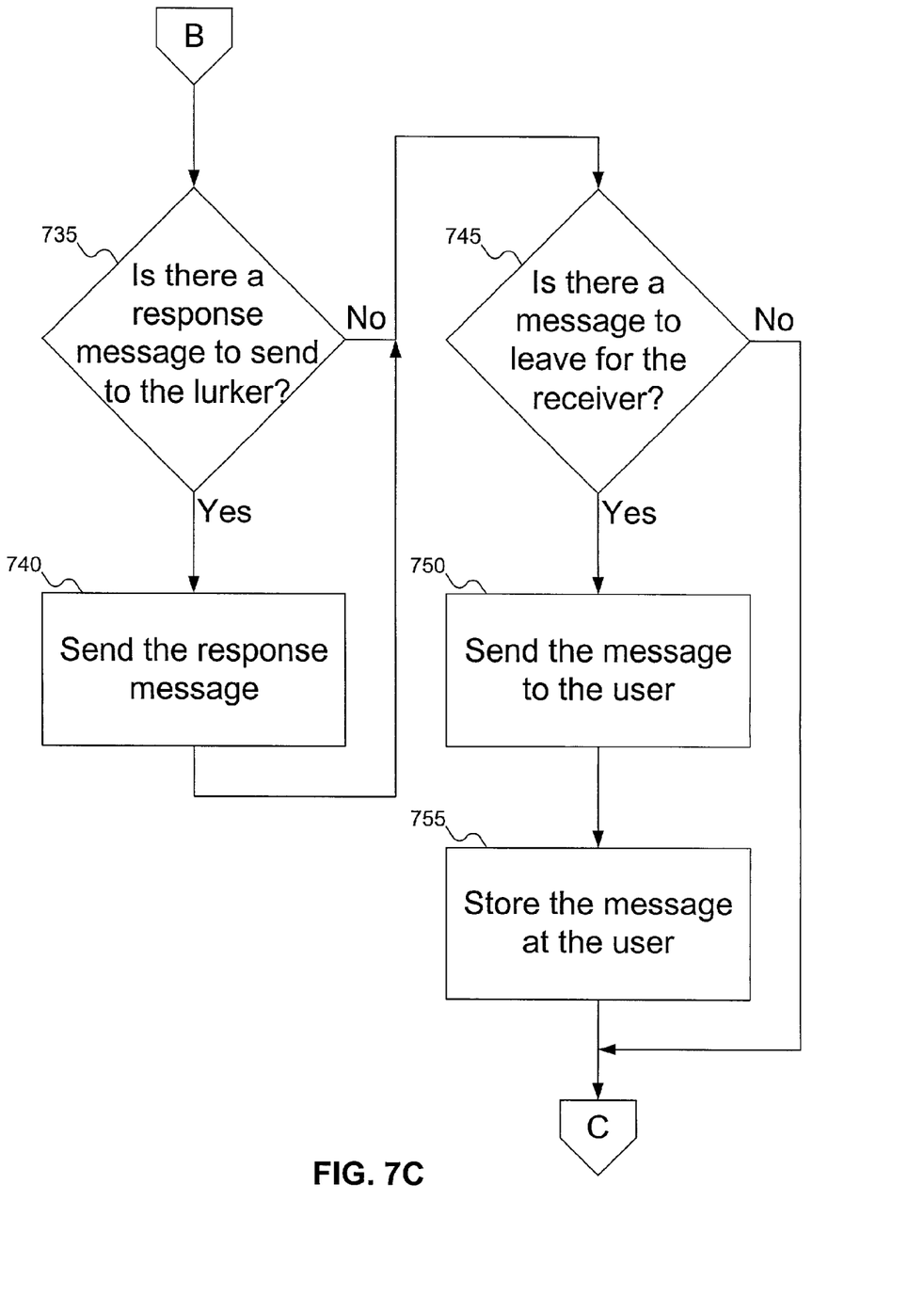

FIGS. 7A-7C show a flowchart of the method used a network lurking agent and a network receiving agent according to the preferred embodiments to enable a lurker to attempt to contact a user. At step 705, the lurker lurks to the environment. At step 710, the network lurking agent sends an inquiry to the network receiving agent as to the availability of the user and devices in the environment. At step 715, the network receiving agent receives the inquiry. At step 720, the network receiving agent checks to see if the user/device requested is available. If the user is available, then at step 725 devices are opened for the lurker and the user, and conversation can begin. Then, when the lurker and user are finished with their conversation, at step 730 the devices are closed.

Alternatively, if the user is not available at step 720, then at step 735 the network receiving agent checks to see if there is a message to send to the lurker. If there is, then at step 740 the network receiving agent sends the message to the lurker. Either way, at step 745 the network lurking agent checks to see if the lurker wants to leave a message for the user. If the lurker wishes to leave a message, then at step 750 the lurker sends the message, which is stored for the recipient at step 755.

An advantage of Net Lurkers is that lurkers do not have to remember phone numbers: they only have to remember how to lurk to the user's location, which will typically be based on a meaningful character string, such as the user's name. If communication by telephone is possible, Net Lurkers will automatically dial the telephones of the lurker and user, and a connection is established. Also, unlike the real-world analog, people can be "in" multiple offices at the same time. For example, assume the user of FIG. 4 is a member of a technical support group. Even though he has a private office, he can also be "in" the technical support office, and thus can be the recipient of communications directed to non-specific members of technical support. In the preferred embodiment, to "enter" multiple rooms, a user opens a window on his computer display for each room, but a person skilled in the art will recognize other techniques that can be used to "enter" rooms.

Users can even be "in" rooms without having a physical location. Consider, for example, a mobile user. When they want to be "in" their office, they can activate their cellular telephone. The network receiving agent will be informed that the cellular telephone is on, and that calls can be established to the user via his cellular telephone. When the user wishes to leave the room, the user can turn his cellular telephone off Using wireless application protocol (WAP) phones, palm handheld devices, or other Internet-enabled wireless technologies, it is even possible for a mobile user to lurk to another's office and at the same time be "in" an office that can be similarly lurked to.

In another embodiment of the invention, where conversations are public and unlimited in the numbers of participants, lurkers can visit a room and listen to a conversation in the room without participating in the conversation. This is similar to tuning to a radio station: you can listen without participating in the conversation. By simply "entering" the room and selecting a conversation, the network lurking agent informs the network receiving agent supporting the conversation to add the lurker to the multicast of the conversation. If the lurker wishes, the lurker can begin to participate in the conversation. The lurker's communications are conveyed to the network receiving agent and are multicast to all the other receivers of the conversation.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A network lurking agent stored on a tangible computer-readable media, the network lurking agent comprising:

an inquirer designed to place an inquiry in a JavaSpace persistent store to determine the availability of an user in an environment, the JavaSpace persistent store including at least one of an environment setting to indicate the availability of the user in the environment, and a user preference setting to indicate whether a device in the environment is enabled to be used; and a lurker designed to retrieve from the JavaSpace persistent store a response to the inquiry to indicate the availability of the user in the environment; and a sender designed to send a message to the JavaSpace persistent store when the user is not available in the environment.

2. A network lurking agent according to claim 1, the network lurking agent further comprising a receiver designed to receive a message from the JavaSpace persistent store.

3. A system stored on a tangible computer-readable media to support network lurking, the system comprising:

a JavaSpace persistent store;

an environment setting stored in the JavaSpace persistent store, the environment setting including at least one of the availability of a device and a user in an environment;

a user preference setting stored in the JavaSpace persistent store to indicate whether a device in the environment is enabled to be used;

a network lurking agent designed to place an inquiry in the JavaSpace persistent store to inquire about the availability of the user in the environment; and a network receiving agent designed to determine the availability of the user in the environment responsive to the inquiry from; and the network lurking agent designed to send a message to the JavaSpace persistent store when the user is not available in the environment.

4. A system according to claim 3, wherein the system notifies the network receiving agent about the inquiry when the network lurking agent places the inquiry in the JavaSpace persistent store.

5. A system according to claim 3, wherein the network receiving agent and the network lurking agent are designed to open devices as a result of the inquiry, the devices enabling communication.

6. A system according to claim 3, wherein;
- the network lurking agent is designed to place a message in the JavaSpace persistent store if the inquiry is refused; and
- the network receiver is designed to refuse the inquiry and to receive the message from the JavaSpace persistent store.

7. A method for using a network lurking agent to electronically lurk to an environment in a system, the method comprising:
- identifying an environment of interest; and
- placing an inquiry as to the availability of a user in the environment of interest in a JavaSpace persistent store, the JavaSpace persistent store including at least one of an environment setting to indicate the availability of the user in the environment, and a user preference setting to indicate whether a device in the environment is enabled to be used; and
- sending a message to the JavaSpace persistent store when the user is not available in the environment.

8. A method according to claim 7, the method further comprising responding to the inquiry by a network receiving agent.

9. A method according to claim 8, wherein responding to the inquiry includes accessing devices by the network lurking agent and the network receiving agent to enable communication.

10. A method according to claim 8, wherein responding to the inquiry includes:
- refusing the inquiry by the network receiving agent;
- placing a message in the JavaSpace persistent store by the network lurking agent;
- retrieving the message from the JavaSpace persistent store by the network receiving agent; and
- storing the message for later access from the environment.

11. A method according to claim 8, wherein responding to the inquiry includes:
- placing a message in the JavaSpace persistent store by the network receiving agent;
- retrieving the message from the JavaSpace persistent store by the network lurking agent; and
- receiving the message at the network lurking agent.

12. A method according to claim 8, wherein responding to the inquiry includes determining the availability of a user in the environment according to an environment setting in the JavaSpace persistent store.

13. A tangible computer-readable medium containing a program to use a network lurking agent to electronically lurk to a location on a computer system, the program being executable on the computer system to implement the method of claim 7.

14. An apparatus stored on a tangible computer-readable media for using a network lurking agent to electronically lurk to an environment in a system, the apparatus comprising:
- means for identifying an environment of interest; and
- means for placing an inquiry as to the availability of a user in the environment of interest in a JavaSpace persistent store, the JavaSpace persistent store including at least one of an environment setting to indicate the availability of the user in the environment, and a user preference setting to indicate whether a device in the environment is enabled to be used; and
- means for sending a message to the JavaSpace persistent store when the user is not available in the environment.

15. An apparatus according to claim 14, the apparatus further comprising means for responding to the inquiry by a network receiving agent.

16. An apparatus according to claim 15, wherein the means for responding includes means for accessing devices by the network lurking agent and the network receiving agent to enable communication.

17. An apparatus according to claim 15, wherein the means for responding includes:
- means for refusing the inquiry by the network receiving agent;
- means for placing a message in the JavaSpace persistent store by the network lurking agent;
- means for retrieving the message from the JavaSpace persistent store by the network receiving agent; and
- means for storing the message for later access from the environment.

18. An apparatus according to claim 15, wherein the means for responding includes:
- means for placing a message in the JavaSpace persistent store by the network receiving agent;
- means for retrieving the message from the JavaSpace persistent store by the network lurking agent; and
- means for receiving the message at the network lurking agent.

19. An apparatus according to claim 15, wherein the means for responding includes means for determining the availability of a user in the environment according to an environment setting in the JavaSpace persistent store.

* * * * *

UNITED STATES PATENT AND TRADEMARK OFFICE
CERTIFICATE OF CORRECTION

PATENT NO.        : 7,415,516 B1
APPLICATION NO.   : 09/882221
DATED             : August 19, 2008
INVENTOR(S)       : Peter Michael Gits et al.

Page 1 of 1

It is certified that error appears in the above-identified patent and that said Letters Patent is hereby corrected as shown below:

On the Title Page, insert at: (63) Related Application Priority Data: Priority from co-pending U.S. Patent Application Serial No. 09/710,544, filed November 8, 2000, now abandoned.

Signed and Sealed this

Fourth Day of November, 2008

JON W. DUDAS
*Director of the United States Patent and Trademark Office*